(12) United States Patent
Lim

(10) Patent No.: US 11,942,849 B2
(45) Date of Patent: Mar. 26, 2024

(54) MOTOR

(71) Applicant: LG INNOTEK CO., LTD., Seoul (KR)

(72) Inventor: Hee Soo Lim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 456 days.

(21) Appl. No.: 17/270,750

(22) PCT Filed: Aug. 27, 2019

(86) PCT No.: PCT/KR2019/010882
§ 371 (c)(1),
(2) Date: Feb. 23, 2021

(87) PCT Pub. No.: WO2020/045936
PCT Pub. Date: Mar. 5, 2020

(65) Prior Publication Data
US 2021/0281139 A1    Sep. 9, 2021

(30) Foreign Application Priority Data
Aug. 30, 2018 (KR) .................. 10-2018-0102693

(51) Int. Cl.
*H02K 5/04*        (2006.01)
*H02K 1/14*        (2006.01)

(52) U.S. Cl.
CPC ............... *H02K 5/04* (2013.01); *H02K 1/146* (2013.01)

(58) Field of Classification Search
CPC .................................. H02K 5/04; H02K 1/146
See application file for complete search history.

(56) References Cited

U.S. PATENT DOCUMENTS 2,306,769 A  *  12/1942  Wilhide ................. H02K 7/145
                                                  173/217
2,320,113 A  *   5/1943  Wilhide ................. H02K 1/185
                                                  173/217

(Continued)

FOREIGN PATENT DOCUMENTS

CH           291014          5/1953
CN        108649719 A  *  10/2018   .............. F04B 39/00

(Continued)

OTHER PUBLICATIONS

Supplementary European Search Report dated Sep. 24, 2021 in European Application No. 19853946.2.

(Continued)

*Primary Examiner* — Robert W Horn
(74) *Attorney, Agent, or Firm* — Saliwanchik, Lloyd & Eisenschenk

(57) ABSTRACT

This embodiment relates to a motor comprising: a housing; a stator disposed within the housing; a rotor disposed inside the stator; and a shaft coupled to the rotor. The housing includes a body and a plurality of protrusions that protrude inward from the inner circumferential surface of the body, and the stator includes a stator core and a coil wound on the stator core. The inner surfaces, which are the inside surfaces of the protrusions, are in contact with the outer circumferential surface of the stator core, and the protrusions are disposed spaced apart at predetermined intervals along the circumferential direction such that gaps (G) are formed in the radial direction between the outer circumferential surface of the stator core and the inner circumferential surface of the body. Accordingly, the protrusions formed on the housing of the motor reduce the amount of contact between the housing and the stator core, and can thus improve friction torque performance.

16 Claims, 8 Drawing Sheets

(56) References Cited

U.S. PATENT DOCUMENTS

| | | | |
|---|---|---|---|
| 3,035,192 A * | 5/1962 | Schaefer | H02K 1/185 310/216.128 |
| 7,511,399 B2 * | 3/2009 | Lung | H02K 1/185 310/216.135 |
| 2015/0372544 A1 | 12/2015 | Iwasaki et al. | |
| 2016/0118857 A1 * | 4/2016 | Jeong | H02K 1/185 310/54 |
| 2017/0292517 A1 | 10/2017 | Lee et al. | |
| 2020/0373794 A1 * | 11/2020 | Kimura | H02K 21/14 |
| 2021/0281139 A1 * | 9/2021 | Lim | H02K 5/04 |
| 2023/0137883 A1 * | 5/2023 | Lee | H02K 1/2773 310/156.08 |

FOREIGN PATENT DOCUMENTS

| | | | |
|---|---|---|---|
| DE | 859 500 | | 12/1952 |
| DE | 10 2014 226 593 A1 | | 6/2016 |
| JP | 8-182276 A | | 7/1996 |
| JP | 3607849 B2 | | 1/2005 |
| JP | 2005-287191 A | | 10/2005 |
| JP | 2008-199711 A | | 8/2008 |
| JP | 2009-33860 A | | 2/2009 |
| JP | 2009-153268 A | | 7/2009 |
| JP | 2009153268 A * | | 7/2009 |
| JP | 2009-177907 A | | 8/2009 |
| JP | 2013-198369 A | | 9/2013 |
| JP | 2013-220030 A | | 10/2013 |
| JP | 2014-121269 A | | 6/2014 |
| JP | 2019115157 A * | 7/2019 | F04B 39/00 |
| KR | 10-2012-0128890 A | | 11/2012 |
| KR | 10-2015-0042379 A | | 4/2015 |
| KR | 20150030040 A * | 9/2015 | H02K 1/16 |
| KR | 10-2016-0120068 A | | 10/2016 |

OTHER PUBLICATIONS

International Search Report dated Dec. 6, 2019 in International Application No. PCT/KR2019/010882.
Office Action dated Jun. 23, 2023 in Chinese Application No. 201980057032.6.
Office Action dated Jun. 28, 2023 in Japanese Application No. 2021-510382.
Office Action dated Jan. 16, 2024 in Japanese Application No. 2021-510382.
Office Action dated Nov. 16, 2023 in European Application No. 19 853 946.2.
Office Action dated Jan. 10, 2024 in Chinese Application No. 201980057032.6.

* cited by examiner

B: 0.1899T

B: 0.1080T

MOTOR

CROSS-REFERENCE TO RELATED APPLICATIONS

This application is the U.S. national stage application of International Patent Application No. PCT/KR2019/010882, filed Aug. 27, 2019, which claims the benefit under 35 U.S.C. § 119 of Korean Patent Application No. 10-2018-0102693, filed Aug. 30, 2018, the disclosures of each of which are incorporated herein by reference in their entirety.

TECHNICAL FIELD

The present invention relates to a motor.

BACKGROUND ART

Motors are apparatuses configured to convert electrical energy to mechanical energy to obtain rotational forces and are widely used for vehicles, home appliances, industrial machines, and the like.

Particularly, as more electric devices are used in a vehicle, demands for a motor applied to a steering system, a braking system, a machinery system, and the like are significantly increasing.

A motor may include a housing, a shaft, a stator disposed on an inner circumferential surface of the housing, a rotor disposed on an outer circumferential surface of the shaft, and the like. In this case, an electrical interaction is induced between the stator and the rotor so that the rotor rotates.

In a process in which the stator is disposed in the housing of the motor, the stator may be coupled to the housing through a hot press fitting method of heating the housing and press-fitting the stator into the housing.

In this case, when the housing is formed of a metal material, there is a problem in that magnetic leakage occurs from a stator core of the stator to the housing. Accordingly, a friction torque of the motor increases.

In order to reduce the friction torque, a notch may be formed at a side of an outer circumferential surface of the stator core. However, when the stator core is punched in a molding process, a problem occurs in that a lifetime of a mold decreases due to a notch portion of the stator core being in continuous contact with the mold.

Technical Problem

The present invention is directed to providing a motor in which a protrusion in contact with a stator core is formed on an inner circumferential surface of a housing to decrease a contact area between the housing and the stator core, and thus the performance of a friction torque is improved.

In addition, the present invention is directed to providing a motor in which a groove is disposed on a radius line of a tooth of a stator core to further improve the performance of a friction torque.

Objectives to be solved by embodiments are not limited to the above-described objectives, and other objectives which are not described above will be clearly understood by those skilled in the art from the following specification.

Technical Solution

One aspect of the present invention provides a motor including a housing, a stator disposed in the housing, a rotor disposed inside the stator, a shaft coupled to the rotor, wherein the housing includes the body and the plurality of protrusions protruding inward from an inner surface of the body and disposed to be spaced apart from each other in a circumferential direction, the stator includes a stator core and a coil wound around the stator core, the inner surface of the body is spaced apart from an outer circumferential surface of the stator core, and an inner surface of the protrusion is in contact with the outer circumferential surface of the stator core.

In this case, the stator core may include yokes and teeth protruding from the yokes in a radial direction, the yoke may include a first region disposed on the same radius as that of the tooth and second regions extending from both ends of the first region in the circumferential direction, and the inner surface of the protrusion is in contact with an outer surface of the yoke disposed in the second region.

Another aspect of the present invention provides a motor including a housing and a stator disposed in the housing, wherein the housing includes a body and a plurality of protrusions protruding inward from an inner surface of the body and disposed to be spaced apart from each other in a circumferential direction, the stator includes a stator core and a coil wound around the stator core, the stator core includes yokes and teeth protruding from the yokes in a radial direction, the yoke includes a first region disposed on the same radius as that of the tooth and second regions extending from both ends of the first region in the circumferential direction, and an inner surface of the protrusion is in contact with an outer surface of the yoke disposed in the second region.

A center (C2) of the plurality of protrusions in the circumferential direction may be disposed on a virtual line (L) connecting a center (C) of the stator core and a center (C1) of the tooth in the radial direction. For example, grooves may be formed between the protrusions in the circumferential direction, and the center (C2) of the plurality of protrusions in the circumferential direction may be disposed on the virtual line (L) connecting the center (C) of the stator core and the center (C1) of the tooth in the radial direction.

In addition, a width of the first region in the circumferential direction may be smaller than a distance (W1) between the protrusions in the circumferential direction. For example, when viewed in the radial direction, the first region is disposed to overlap the groove, and the width of the first region may be smaller than a width (W1) of the groove in the circumferential direction.

The distance (W1) between the plurality of protrusions in the circumferential direction may be 2.9 to 3.1 times a width (W2) of each of the plurality of protrusions in the circumferential direction. For example, the width (W1) of the groove in the circumferential direction may be 2.9 to 3.1 times the width (W2) of the protrusion in the circumferential direction.

The stator core may include the yokes and the plurality of teeth protruding from the yokes in the radial direction and spaced apart from each other in the circumferential direction, and the teeth may be symmetrically disposed on the basis of a virtual line (L2) connecting the center (C) of the stator core and a center (C3) of the protrusion in the radial direction.

The protrusion may not be disposed between two virtual lines (HL1) each extending along a corresponding one side surface of one of the plurality of teeth of the stator core.

The number of the plurality of protrusions may be the same as the number of the teeth of the stator core.

The housing may be formed of a metal material.

A length of the protrusion in a shaft direction may be greater than a length of the stator core in the shaft direction. In this case, a lower portion of the protrusion may be disposed to be spaced from a lower surface of the body by a predetermined height (H).

Advantageous Effects

In a motor according to embodiments, since a protrusion in contact with a stator core is formed on an inner circumferential surface of a housing, a contact area between the housing and the stator core can be decreased to improve the performance of a friction torque. In addition, since the contact area between the housing and the stator core is decreased, a magnetic flux leakage through the housing can be decreased.

In this case, since a notch formed on an outer circumferential surface of the stator core is removed, a lifetime of a mold for producing the stator core can be increased. Accordingly, since a change in dimension of a mold, which occurs when a conventional stator core is punched, is inhibited, the quality of the motor can be improved, and since the lifetime of the mold is increased, a production cost can be reduced.

Useful advantages and effects of the embodiments are not limited to the above-described contents and will be more easily understood from descriptions of the specific embodiments.

MODES OF THE INVENTION

Figure 1:
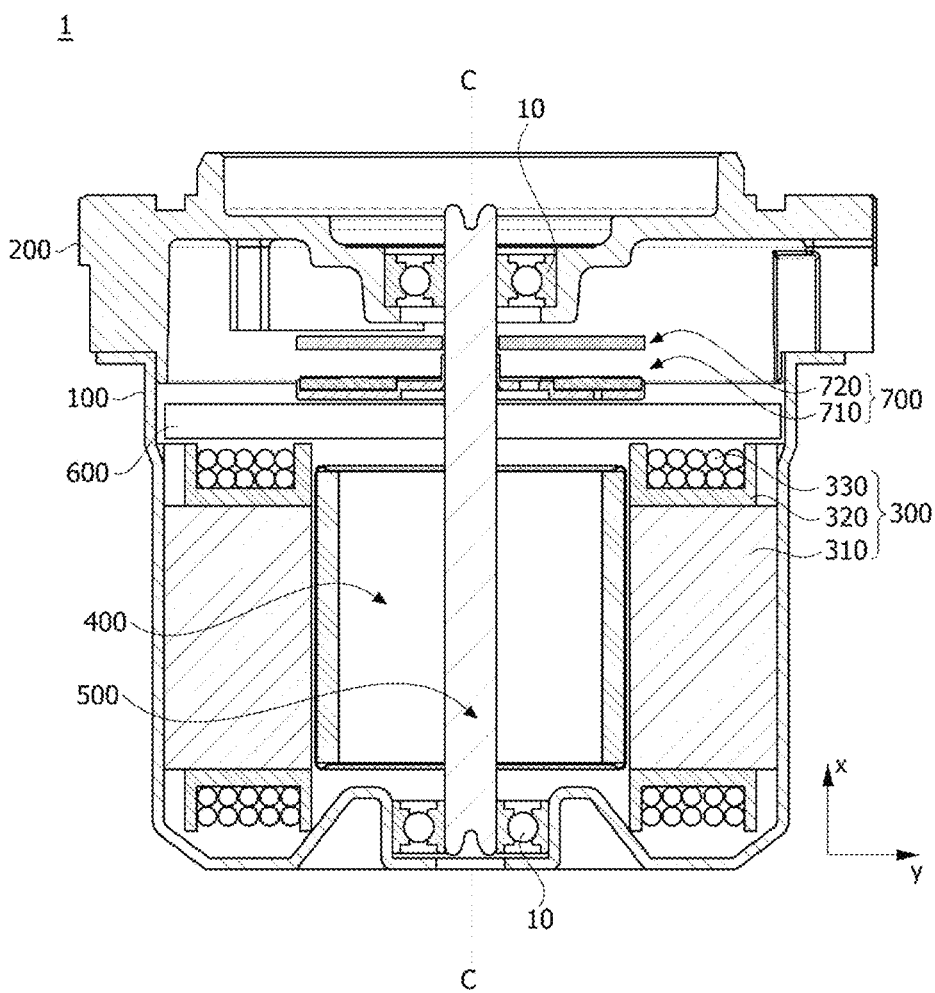
FIG. 1 is a view illustrating a motor according to an embodiment.

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Hereinafter, example embodiments of the invention will be described in detail with reference to the accompanying drawings. Components that are the same or correspond to each other will be denoted by the same reference numerals regardless of the figure numbers, and redundant descriptions will be omitted.

Figure 2:
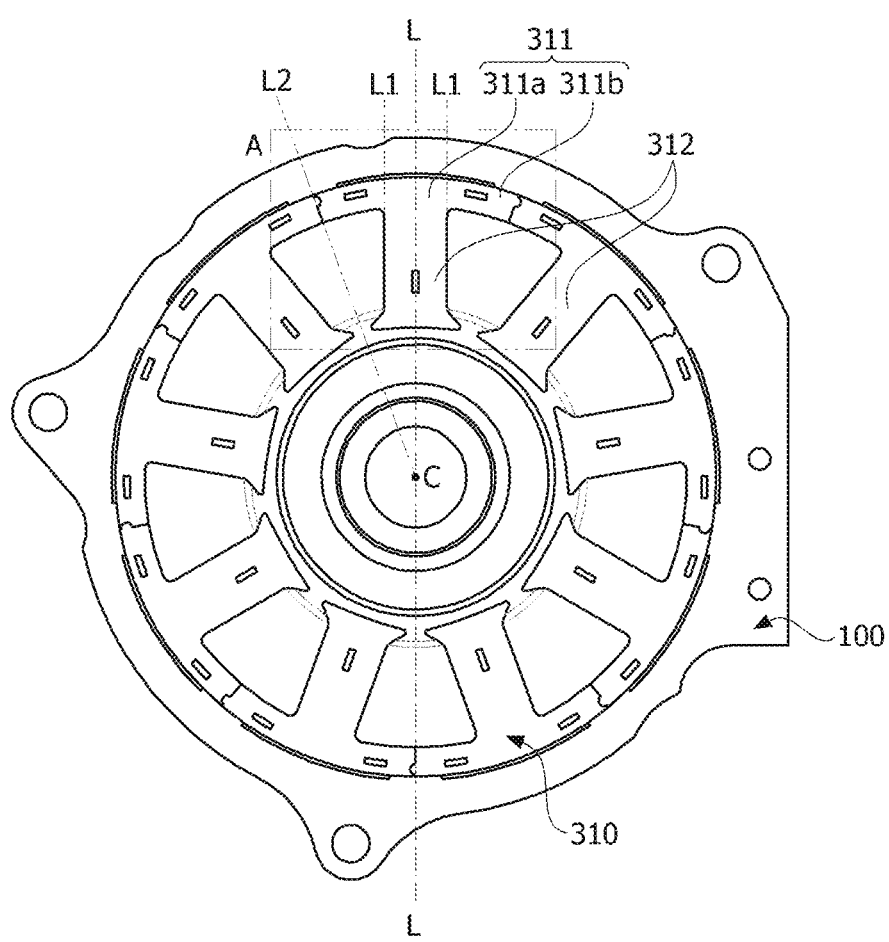
FIG. 2 is a view illustrating an arrangement relationship between a housing and a stator core of the motor according to the embodiment.
Figure 3:
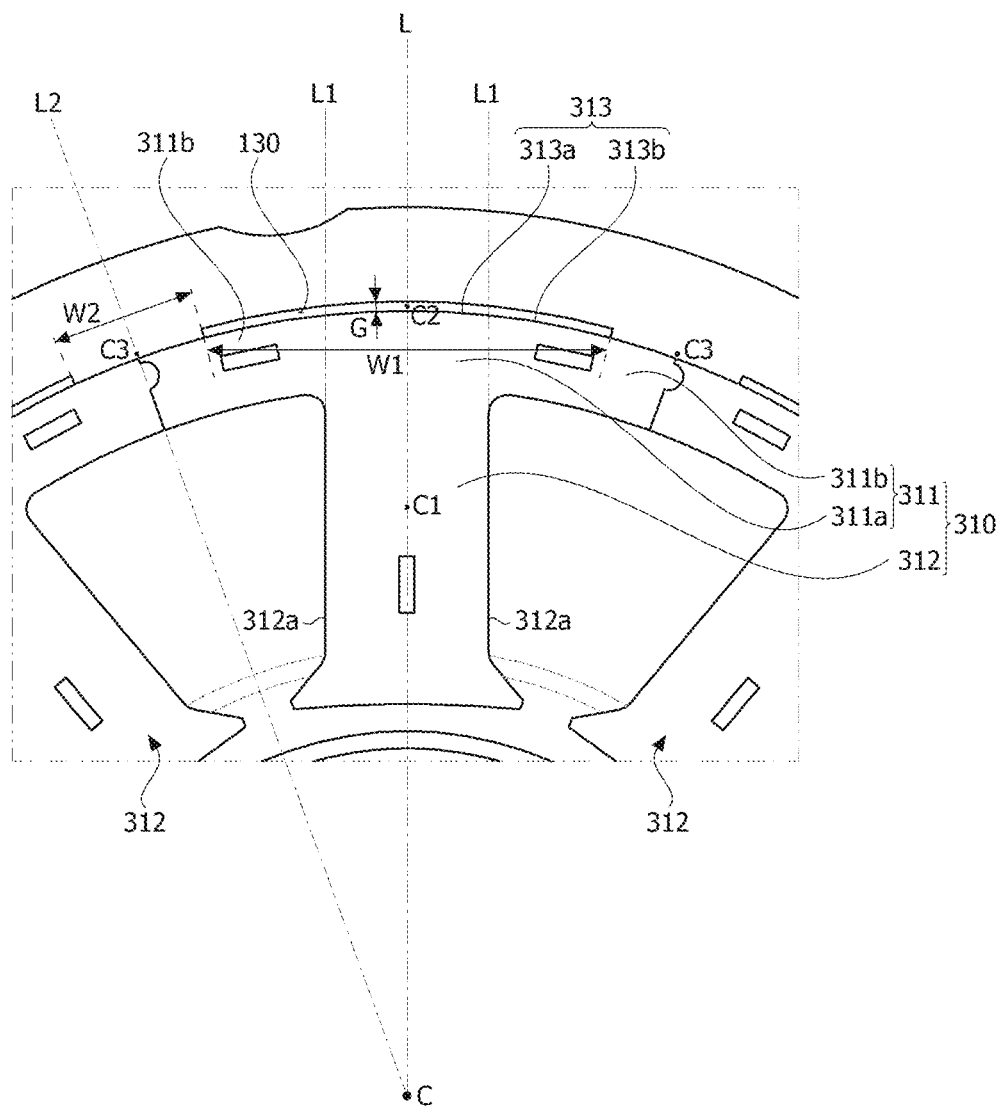
FIG. 3 is an enlarged view illustrating region A of FIG. 2.

FIG. 1 is a view illustrating a motor according to an embodiment, FIG. 2 is a view illustrating an arrangement relationship between a housing and a stator core of the motor according to the embodiment, and FIG. 3 is an enlarged view illustrating region A of FIG. 2. In FIG. 2, an x direction may be referred to as a shaft direction and a y direction may be referred to as a radial direction. In addition, the shaft direction may be perpendicular to the radial direction.

Referring to FIGS. 1 to 3, a motor 1 according to the embodiment may include a housing 100 in which an opening is formed at one side thereof, a cover 200 disposed on the housing 100, a stator 300 disposed in the housing 100, a rotor 400 disposed inside the stator 300, a shaft 500 coupled to the rotor 400 to rotate with the rotor 400, a busbar 600 disposed above the stator 300, and a sensor part 700 configured to detect rotation of the rotor 400. In this case, the stator 300 may include a stator core 310, insulators 320 disposed on the stator core 310, and a coil 330 wound around the insulators 320. In this case, the term "inside" may be referred to as a direction toward a center C, and the term "outside" may be referred to as a direction opposite to the term "inside".

The motor 1 may be a motor used in an electronic power steering (EPS) system. The EPS system may assist a steering force using a driving force of the motor to secure turning stability and provide a rapid restoring force of a vehicle. Accordingly, a driver of the vehicle can travel safely.

The housing 100 and the cover 200 may form an exterior of the motor 1. In addition, the housing 100 may be coupled to the cover 200 to form an accommodation space. Accordingly, as illustrated in FIG. 1, the stator 300, the rotor 400, the shaft 500, the busbar 600, the sensor part 700, and the like may be disposed in the accommodation space. In this case, the shaft 500 is rotatably disposed in the accommodation space. Accordingly, the motor 1 may further include bearings 10 disposed on an upper portion and a lower portion of the shaft 500.

The housing 100 may be formed to have a cylindrical shape. In addition, the rotor 400, the stator 300, and the like may be accommodated in the housing 100. In this case, the housing 100 may be formed of a metal material which firmly withstands even at high temperature. However, in the case in which the housing 100 is formed of the metal material, since the housing 100 is in contact with the stator core 310, a magnetic flux may leak from the stator core 310 to the housing 100.

Figure 4:
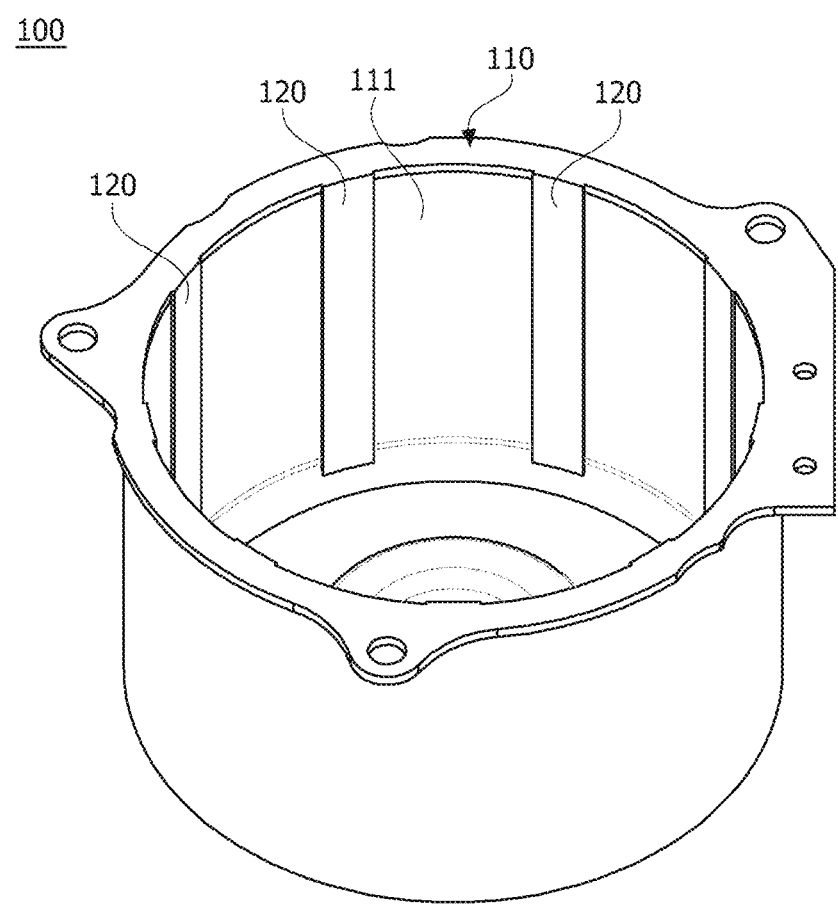
FIG. 4 is a perspective view illustrating the housing of the motor according to the embodiment.
Figure 5:
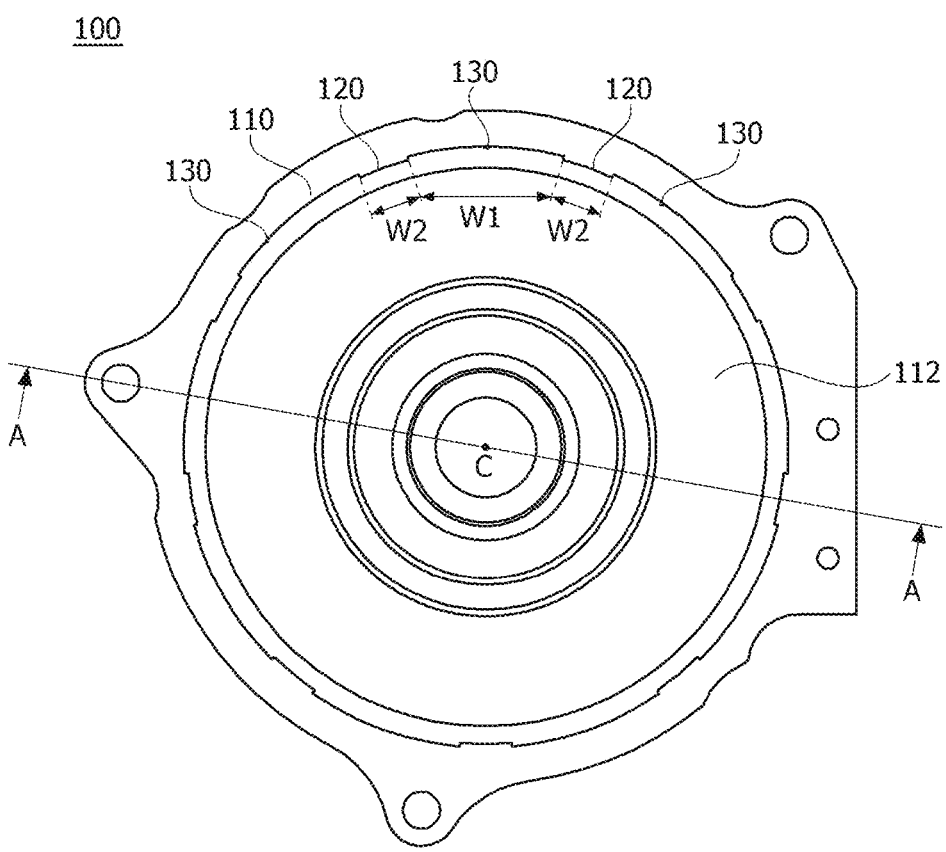
FIG. 5 is a plan view illustrating the housing of the motor according to the embodiment.
Figure 6:
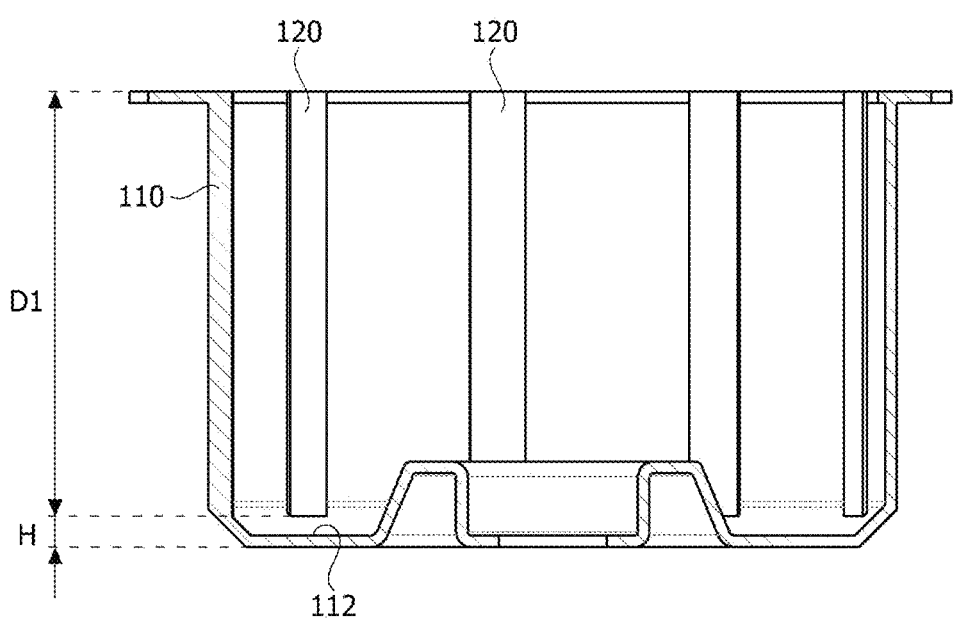
FIG. 6 is a cross-sectional view illustrating the housing of the motor according to the embodiment.

FIG. 4 is a perspective view illustrating the housing of the motor according to the embodiment, FIG. 5 is a plan view illustrating the housing of the motor according to the embodiment, and FIG. 6 is a cross-sectional view illustrating the housing of the motor according to the embodiment. In this case, FIG. 6 is a view taken along line A-A of FIG. 5.

Referring to FIGS. 4 to 6, the housing 100 may include a body 110 and protrusions 120 disposed on an inner surface of the body 110. In this case, the protrusion 120 may be formed in a bar shape disposed in the shaft direction. In this case, the body 110 and the protrusions 120 may be integrally formed. In addition, the body 110 may be referred to as a housing body.

The body 110 may be formed in a cylindrical shape. In addition, the stator 300, the rotor 400, and the like may be disposed in the body 110.

The protrusion 120 may be formed to protrude from an inner surface 111 which is an inner circumferential surface of the body 110 in the radial direction. In this case, since the protrusions 120 formed in the housing 100 are in contact with an outer circumferential surface of the stator core 310 of the stator, a contact area between the housing 100 and the stator core 310 may be decreased.

Referring to FIG. 4, the protrusions 120 may be disposed to be spaced apart from each other in a circumferential direction. Accordingly, grooves 130 may be formed between the protrusions 120 in the circumferential direction. Accordingly, as illustrated in FIG. 3, gaps G may be formed between an outer surface 313 of the stator core 310 and the inner surface 111 of the body 110 due to the grooves 130. In addition, the contact area between the housing 100 and the stator core 310 is decreased due to the groove 130.

In addition, a width W1 of the groove 130 may be 2.9 to 3.1 times a width W2 of the protrusion in the circumferential direction. In a case in which the width W1 of the groove 130 is less than 2.9 times the width W2 of the protrusion, since the contact area between the housing 100 and the stator core 310 is insufficient, a case in which the stator 300 is not fixed in the housing 100 may occur. In addition, in a case in which the width W1 of the groove 130 is greater than 3.1 times the width W2 of the protrusion, since a magnetic flux leakage from the stator core 310 to the housing 100 increases, the leakage affects the performance of the motor 1.

Meanwhile, a center C2 of the groove 130 may be disposed on a virtual line L connecting a center C of the stator core 310 and a center C1 of one of teeth 312 in the radial direction.

Referring to FIG. 6, the protrusion 120 may be formed to have a predetermined length D1 in the shaft direction. In this case, a lower portion of the protrusion 120 may be disposed to be spaced apart from a lower surface 112 of the body 110 by a predetermined height H. In addition, an upper surface of the protrusion 120 may be in contact with a lower portion of the cover 200 to support the cover 200.

As illustrated in FIG. 4, at least nine protrusions 120 may be disposed at the same interval on the body 110 in the circumferential direction. In this case, although the example in which nine protrusions 120 are provided is described, the present invention is not necessarily limited thereto. For example, the number of the protrusions 120 may correspond to the number of teeth 312 of the stator core 310. That is, the number of the protrusions 120 is the same as the number of the teeth 312 of the stator core 310.

Referring to FIGS. 2 and 3, the protrusion 120 is not disposed between two virtual lines L1 each extending along a corresponding one side surface 312a of one of the plurality of teeth 312 of the stator core 310. For example, when viewed in the radial direction, the protrusion 120 is disposed to be spaced apart from the tooth 312 in the circumferential direction.

Meanwhile, the protrusion 120 may also protrude in an embo process. That is, a force may be applied to an outer side of the body 110 so that the protrusion 120 may protrude inward from the body 110.

The cover 200 may be disposed on an opening surface, that is, an upper surface, of the housing 100 to cover the opening of the housing 100.

The stator 300 may be disposed inside the housing 100. In this case, the stator 300 may be coupled to the housing 100 through a hot press fitting method. Accordingly, the stator 300 may be supported by the protrusions 120 of the housing 100. In addition, the stator 300 is disposed outside the rotor 400. That is, the rotor 400 may be rotatably disposed inside the stator 300.

Figure 7:
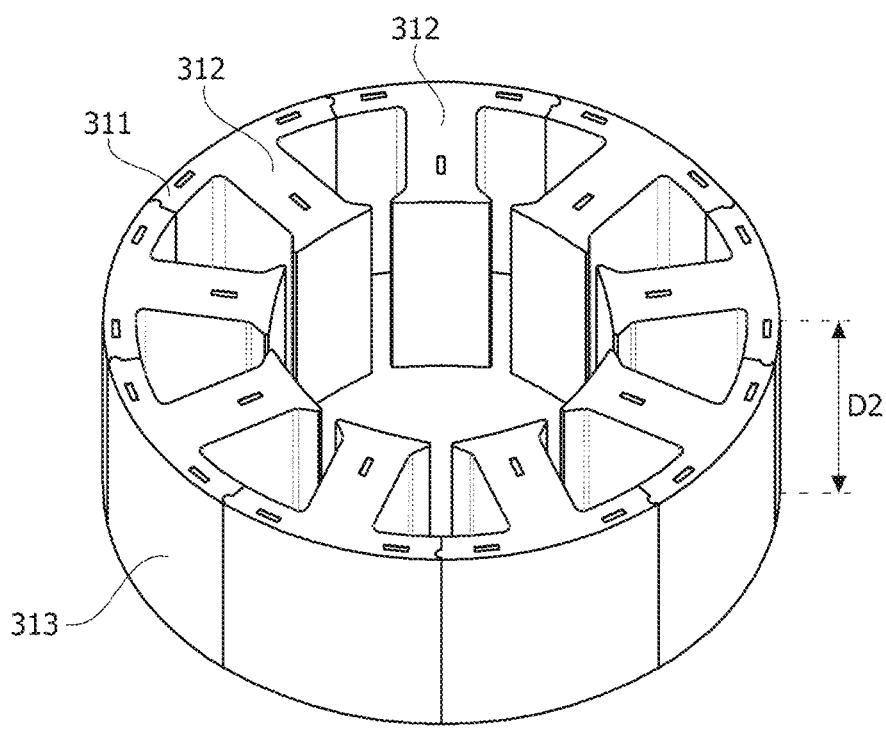
FIG. 7 is a perspective view illustrating the stator core of the motor according to the embodiment.

FIG. 7 is a perspective view illustrating the stator core of the motor according to the embodiment.

Referring to FIGS. 1, 2, and 7, the stator 300 may include the stator core 310, the insulators 320 disposed on the stator core 310, and the coil 330 wound around the insulators 320. In this case, the insulator 320 may be disposed between the stator core 310 and the coil 330 to insulate the coil 330 from the stator core 310.

The coil 330 configured to generate a rotating magnetic field may be wound around the stator core 310.

The stator core 310 may be formed in a form in which a plurality of thin steel plates are stacked on each other but is not limited thereto. For example, the stator core 310 may be formed as one single product. In addition, a plurality of unit stator cores may be disposed along the circumferential direction to form the stator core 310.

As illustrated in FIG. 7, the stator core 310 may be formed to have a predetermined length D2 in the shaft direction. Accordingly, the length D1 of the protrusion 120 in the shaft direction may be greater than the length D2 of the stator core 310 in the shaft direction. In this case, the length D1 of the protrusion 120 in the shaft direction may be referred to as the width of the protrusion 120 in the shaft direction, and the length D2 of the stator core 310 in the shaft direction may be referred to as a width of the stator core 310 in the shaft direction.

Accordingly, the outer surface 313 which is the outer circumferential surface of the stator core 310 may be supported by an inner surface of the protrusion 120. When the length D2 of the stator core 310 in the shaft direction is the same as the length D1 of the protrusion 120 in the shaft direction, a tilting phenomenon may occur when the motor 1 is driven due to incomplete assembly when the stator 300 is assembled with the housing 100, and thus the tilting phenomenon may affect the performance and quality of the motor 1. In addition, in a case in which the length D2 of the stator core 310 in the shaft direction is smaller than the length D1 of the protrusion 120 in the shaft direction, the tilting phenomenon may occur when the motor 1 is driven, and thus the tilting phenomenon may affect the performance and quality of the motor 1.

Referring to FIGS. 2 and 7, the stator core 310 may include yokes 311 having a cylindrical shape and the plurality of teeth 312. In addition, the teeth 312 may be formed to protrude from inner circumferential surfaces of the yokes 311 in the radial direction to wind the coil 330 therearound. In this case, an example in which the yoke 311 and the tooth 312 are integrally formed is described but is not necessarily limited thereto.

Each of the yokes 311 formed in a ring shape when viewed from above may include a first region 311a disposed on the same radius as that of the tooth 312 and second regions 311b extending from the first region 311a in the circumferential direction. Accordingly, as illustrated in FIG. 3, the outer surface 313 of the yoke 311 may be divided into an outer circumferential surface 313a of the first region 311a and outer circumferential surfaces 313b of the second regions 311b.

When viewed in the radial direction, the first region 311a is a region overlapping the tooth 312. In addition, the outer circumferential surface 313a of the first region 311a may be disposed to face the groove 130.

In this case, a width of the first region 311a is smaller than the width W1 of the groove 130 in the circumferential direction. In addition, the width of the first region 311a is the same as a width of the tooth 312 in the circumferential direction. Accordingly, the first region 311a of the yoke 311 may be disposed between the virtual lines L1 each extending along a corresponding one side surface 312a of one of the plurality of teeth 312.

The second region 311b is a region extending from the first region 311a in the circumferential direction, and the inner surface of the protrusion 120 may be in contact with the outer circumferential surface 313b of the second region 311b.

Figure 8A:
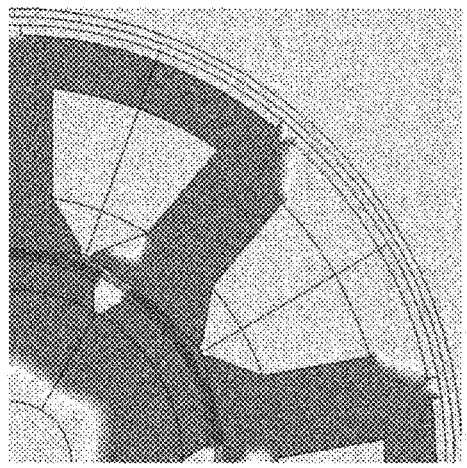
FIG. 8A is a view showing a magnetic flux density when a protrusion of the housing is in contact with a first region of the stator core of the motor according to the embodiment.
Figure 8B:
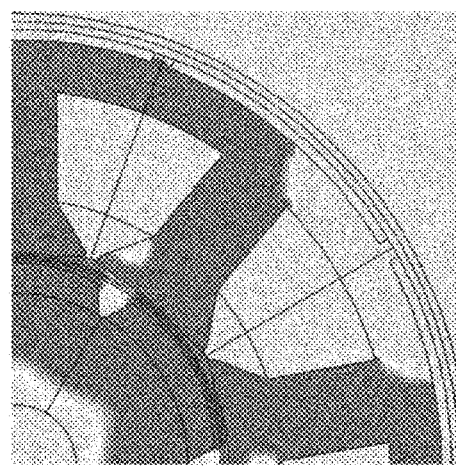
FIG. 8B is a view illustrating a magnetic flux density when the protrusion of the housing is in contact with a second region of the stator core of the motor according to the embodiment.

FIGS. 8A and 8B are set of views illustrating a magnetic flux density according to a position of the protrusion of the housing of the motor according to the embodiment, FIG. 8A is a view illustrating the magnetic flux density in a case in which the protrusion 120 of the housing 100 is in contact with the first region 311a, and FIG. 8B is a view illustrating the magnetic flux density in a case in which the protrusion 120 of the housing 100 is in contact with the second region 311b.

As illustrated in FIG. 8A, in the case in which the protrusion 120 of the housing 100 is in contact with the first region 311a, it may be seen that an internal magnetic flux density B of the housing 100 is 0.1899 T. In addition, as illustrated in FIG. 8B, in the case in which the protrusion 120 of the housing 100 is in contact with the second region 311b, it may be seen that an internal magnetic flux density B of the housing 100 is 0.1080 T.

Accordingly, it may be seen that the magnetic flux density may be changed according to the position of the protrusion 120 of the housing 100 in the motor 1. In addition, it may be seen that, when the protrusion 120 of the housing 100 is disposed in contact with the second region 311b, the internal magnetic flux density B of the housing 100 is less than the magnetic flux density A thereof when the protrusion 120 of the housing 100 is in contact with the first region 311a in the motor 1. Accordingly, it may be seen that the friction performance of the motor 1 is improved. In this case, the term "friction performance" may denote a state in which a magnetic flux leaking to the housing 100 is small.

That is, since the protrusion 120 of the housing 100 is in contact with the second region 311b, the friction performance of the motor 1 may be improved.

The plurality of teeth 312 may be disposed to protrude from the inner circumferential surfaces of the yokes 311 in the radial direction. In this case, the teeth 312 may be disposed to be spaced apart from each other in the circumferential direction. Accordingly, slots may be formed between teeth 312 for winding the coil 330.

Referring to FIGS. 2 and 3, the teeth 312 may be disposed to be symmetrical on the basis of virtual lines L2 connecting the center C of the stator core 310 and centers C3 of the protrusions 120 in the radial direction.

In addition, the coil 330 may be wound around the tooth 312. In this case, the insulator 320 disposed between the tooth 312 and the coil 330 may insulate the coil 330 from the tooth 312.

Meanwhile, the width of the tooth 312 may be greater than the width W2 of the protrusion 120 and smaller than the width W1 of the groove 130 in the circumferential direction.

In addition, the tooth 312 may be disposed to face the magnet of the rotor 400.

The insulator 320 may be formed of a synthetic resin material to insulate the stator core 310 from the coil 330.

In addition, the coil 330 may be wound around the stator core 310 on which the insulator 320 is disposed. In addition, the coil 330 may receive power to generate a rotating magnetic field.

The insulators 320 may be coupled to an upper side and a lower side of the stator core 310. In this case, the insulators 320 may also be formed as one single product for coupling to the stator core 310. Alternately, a plurality of unit insulators may also be formed as the insulators 320 so that the insulators 320 are disposed on the stator core 310 in the circumferential direction.

Referring to FIG. 1, the rotor 400 may be disposed inside the stator 300, and the shaft 500 may be coupled to a central portion of the rotor 400 through a press-fitting method.

In addition, the rotor 400 may be rotatably disposed inside the stator 300.

The rotor 400 may include a rotor core (not shown) and a plurality of magnets (not shown) disposed on an outer circumferential surface of the rotor core in the circumferential direction. In this case, the magnets of the rotor 400 may be referred to as rotor magnets or drive magnets. In this case, an example in which the plurality of magnets are disposed on the outer circumferential surface of the rotor core in the rotor 400 is described, but the present invention is not necessarily limited thereto. For example, the rotor 400 may be formed as an interior permanent magnet (IPM) type rotor in which magnets are formed in a rotor core.

The rotor core may be formed in a form in which a plurality of thin circular steel plates are stacked on each other or in one cylindrical form. In addition, a hole coupled to the shaft 500 may be formed at a center C of the rotor core.

The magnets generate a rotating magnetic field with respect to the coil 330 wound around the stator core 310 of the stator 300. The magnets may be disposed so that an N-pole and an S-pole are alternately positioned around a center of the shaft 500 in the circumferential direction.

Accordingly, due to an electrical interaction between the coil 330 and the magnets, the rotor 400 is rotated, and the shaft 500 is rotated in conjunction with the rotation of the rotor 400 so that a driving force of the motor 1 is generated.

Meanwhile, the rotor 400 may further include a can (not shown) disposed to cover the rotor core to which the magnets are attached.

The can protects the rotor core and the magnets from external shocks and physical and chemical stimuli while inhibiting foreign materials from being introduced to the rotor core and magnets.

In addition, the can prevents the magnets from being separated from the rotor core.

As illustrated in FIG. 1, the shaft 500 may be rotatably supported by the bearings 10 in the housing 100. In addition, the shaft 500 may be rotated in conjunction with the rotation of the rotor 400.

The busbar 600 may be disposed on the stator 300.

In addition, the busbar 600 may be electrically connected to the coil 330 of the stator 300.

The busbar 600 may include a busbar body and a plurality of terminals disposed in the busbar body. In this case, the busbar body may be a mold product formed through an injection molding process. In addition, each of the terminals may be connected to the coil 330 of the stator 300.

The sensor part 700 may detect a magnetic force of a sensing magnet installed to rotate in conjunction with the rotor 400 to check a present position of the rotor 400 so as to detect rotation of the shaft 500.

The sensor part 700 may include a sensing magnet assembly 710 and a printed circuit board (PCB) 720.

The sensing magnet assembly 710 is coupled to the shaft 500 to rotate in conjunction with the rotor 400 so as to detect a position of the rotor 400. In this case, the sensing magnet assembly 710 may include sensing magnets and a sensing plate. The sensing magnets and the sensing plate may be coaxially coupled.

The sensing magnets may include main magnets disposed close to a hole forming an inner circumferential surface thereof in the circumferential direction and sub-magnets.

The main magnets may be arranged like the drive magnets inserted into the rotor 400 of the motor.

The sub-magnets may be divided further than the main magnets so that the sub-magnets may be formed to have poles of which the number is greater than the number of poles of the main magnets. Accordingly, a rotation angle may be divided and measured more precisely, and thus the motor may be driven more smoothly.

The sensing plate may be formed of a metal material having a disc shape. The sensing magnet may be coupled to an upper surface of the sensing plate. In addition, the sensing plate may be coupled to the shaft 500. In this case, a hole through which the shaft 500 passes may be formed in the sensing plate.

In addition, the can inhibits the magnets from being separated from the rotor core.

While the present invention has been described with reference to the exemplary embodiments thereof, it will be understood by those skilled in the art that various changes in form and details may be made therein without departing from the spirit and scope of the invention as defined by the appended claims.

REFERENCE NUMERALS

1: MOTOR
100: HOUSING
120: PROTRUSION
130: GROOVE
200: COVER
300: STATOR
310: STATOR CORE
330: COIL
400: ROTOR
500: SHAFT
600: BUSBAR
700: SENSOR PART

The invention claimed is:

1. A motor comprising:
a housing; and
a stator disposed in the housing,
wherein the housing includes a body and a plurality of protrusions protruding inward from an inner surface of the body and disposed to be spaced apart from each other in a circumferential direction,
the stator includes a stator core and a coil wound around the stator core,
an outer circumferential surface of the stator core forms a circle at a radius,
the inner surface of the body is spaced apart from an outer circumferential surface of the stator core, and
an inner surface of the protrusion is in contact with the outer circumferential surface of the stator core,
wherein the stator core includes yokes formed in a ring shape and teeth protruding from the yokes in a radial direction,
wherein each of the plurality of protrusions is not disposed in a first width area between two virtual lines each extending along a corresponding one side surface of one of the plurality of teeth of the stator core, plus an additional width at each side of the two virtual lines, the additional width being at least 10 percent of a width of the first width area.

2. The motor of claim 1, wherein:
the yoke includes a first region disposed on the same radius as that of the tooth and second regions extending from both ends of the first region in the circumferential direction; and
the inner surface of the protrusion is in contact with an outer surface of the yoke disposed in the second region.

3. The motor of claim 2, wherein the housing includes a groove formed between two of the protrusions in the circumferential direction, and
wherein a center (C2) of the groove in the circumferential direction is disposed on a virtual line (L) connecting a center (C) of the stator core and a center (C1) of the tooth in the radial direction.

4. The motor of claim 3, wherein a width of the first region in the circumferential direction is smaller than a width (W1) of the groove in the circumferential direction.

5. The motor of claim 4, wherein the distance (W1) between the plurality of protrusions in the circumferential direction is 2.9 to 3.1 times a width (W2) of each of the plurality of protrusions in the circumferential direction.

6. The motor of claim 2, wherein the number of the plurality of protrusions is the same as the number of teeth of the stator core.

7. The motor of claim 1, wherein a length of the protrusion in a shaft direction is greater than a length of the stator core in the shaft direction.

8. The motor of claim 7, wherein a lower portion of the protrusion is disposed to be spaced apart from a lower surface of the body by a predetermined height (H).

9. The motor of claim 1, wherein the body and the protrusion are integrally formed.

10. The motor of claim 2, wherein the housing includes a groove formed between two of the protrusions in the circumferential direction.

11. A motor comprising:
a housing; and
a stator disposed in the housing,
wherein the housing includes a body and a plurality of protrusions protruding inward from an inner surface of the body and disposed to be spaced apart from each other in a circumferential direction,
the stator includes a stator core and a coil wound around the stator core,
an outer circumferential surface of the stator core forms a circle at a radius,
the stator core includes yokes and teeth protruding from the yokes in a radial direction,
the yoke includes a first region disposed on the same radius as that of the tooth and second regions extending from both ends of the first region in the circumferential direction, and
an inner surface of the protrusion is in contact with an outer surface of the yoke disposed in the second region,
wherein each of the plurality of protrusions is not disposed in a first width area between two virtual lines each extending along a corresponding one side surface of one of the plurality of teeth of the stator core, plus an additional width at each side of the two virtual lines, the additional width being at least 10 percent of a width of the first width area.

12. The motor of claim 11, wherein the housing includes a groove formed between two of the protrusions in the circumferential direction, and
wherein a center (C2) of the groove in the circumferential direction is disposed on a virtual line (L) connecting a center (C) of the stator core and a center (C1) of the tooth in the radial direction.

13. The motor of claim 12, wherein a width of the first region in the circumferential direction is smaller than a width (W1) of the groove in the circumferential direction.

14. The motor of claim 13, wherein the distance (W1) between the plurality of protrusions in the circumferential direction is 2.9 to 3.1 times a width (W2) of each of the plurality of protrusions in the circumferential direction.

15. The motor of claim 11, wherein a length of the protrusion in a shaft direction is greater than a length of the stator core in the shaft direction.

16. The motor of claim 15, wherein a lower portion of the protrusion is disposed to be spaced apart from a lower surface of the body by a predetermined height (H).

* * * * *